(12) United States Patent
Huang et al.

(10) Patent No.: US 11,719,465 B2
(45) Date of Patent: Aug. 8, 2023

(54) AIR CONTROL METHOD FOR AIR HANDLER UNIT

(71) Applicant: ECOER INC., Fairfax, VA (US)

(72) Inventors: Zhicheng Huang, Beijing (CN); Zhonghui Li, Beijing (CN)

( * ) Notice: Subject to any disclaimer, the term of this patent is extended or adjusted under 35 U.S.C. 154(b) by 926 days.

(21) Appl. No.: 16/616,955

(22) PCT Filed: Jul. 15, 2019

(86) PCT No.: PCT/US2019/041787
§ 371 (c)(1),
(2) Date: Nov. 25, 2019

(87) PCT Pub. No.: WO2021/010957
PCT Pub. Date: Jan. 21, 2021

(65) Prior Publication Data
US 2021/0333014 A1  Oct. 28, 2021

(51) Int. Cl.
*F24H 3/04* (2022.01)
*F24F 11/74* (2018.01)
*F04D 25/08* (2006.01)
*G05D 23/19* (2006.01)

(52) U.S. Cl.
CPC .......... *F24H 3/0411* (2013.01); *F04D 25/08* (2013.01); *F24F 11/74* (2018.01); *G05D 23/1919* (2013.01); *F05D 2270/303* (2013.01); *F05D 2270/311* (2013.01)

(58) Field of Classification Search
CPC ........ F24H 3/0411; F24F 11/74; F04D 25/08; F05D 2270/311; F05D 2270/303; G05D 25/1919
USPC .......................................................... 454/236
See application file for complete search history.

(56) References Cited

U.S. PATENT DOCUMENTS

| | | | | |
|---|---|---|---|---|
| 5,492,273 | A * | 2/1996 | Shah | F24F 11/88 236/11 |
| 6,456,023 | B1 * | 9/2002 | Becerra | H02P 6/34 318/400.26 |
| 7,191,607 | B2 * | 3/2007 | Curtis | F24F 11/77 62/215 |
| 8,380,354 | B2 * | 2/2013 | Zhao | F24F 11/30 236/44 C |
| 10,605,495 | B1 * | 3/2020 | Falls | F25B 13/00 |
| 2008/0307803 | A1 * | 12/2008 | Herzon | F24F 11/77 62/93 |
| 2015/0019022 | A1 * | 1/2015 | Karamanos | G05B 17/02 700/276 |
| 2017/0167744 | A1 * | 6/2017 | Arensmeier | F24F 11/30 |

* cited by examiner

*Primary Examiner* — Avinash A Savani
*Assistant Examiner* — Dana K Tighe
(74) *Attorney, Agent, or Firm* — John Ye

(57) ABSTRACT

The present disclosure relates to the field of air conditioning technology. In particular, it involves an air control method for air handler unit.

3 Claims, 3 Drawing Sheets

AIR CONTROL METHOD FOR AIR HANDLER UNIT

BACKGROUND OF THE DISCLOSURE

The disclosure below will assume common knowledge of air conditioning and heat pump as well as their heat exchange principle in terms of achieving cooling and heating.

With the continuous development of air-conditioning technology, Air Handler Unit is widely used in homes, businesses and other places due to its good performance, small footprint, easy installation and wide adaptation. The Electronically Commutated Motor (ECM motor) in the existing air handler unit has the advantages of high efficiency and simple speed regulation, and has largely replaced the conventional Permanent Split Capacitor (PSC) motor in an energy-efficient machine.

In general, ECM motors typically have five different speeds, with the first gear being the lowest speed and the fifth gear being the highest speed. Correspondingly, there are 5 corresponding terminals on the ECM motor. When a certain gear position needs to be selected, 24 VAC voltage needs to be applied between the corresponding terminal and the common terminal COM. When two or more gear positions are selected at the same time, priority is given to the higher gear. Since the ECM motor is fully compatible with the 24 VAC thermostat system, there is no need to modify the equipment when applying the ECM motor to the air handler unit. When installing the equipment, the installation personnel set the appropriate air volume position through the DIP switch connected to the ECM motor's terminal block in the air handler unit according to the capacity of the on-site machine, the length of the air duct and the static pressure. When the equipment is installed and commissioned, the air volume in the air handler unit is fixed. During the use of the equipment, the ECM motor in the air handler unit will only operate in the following two states, regardless of whether the equipment is in cooling, heating, defrosting, or any change in load: 1. Shutdown; 2. Run on a fixed single gear.

FIG. 1 is a schematic diagram of a connection between a thermostat and an air handler unit ECM motor in the prior art, using 24 VAC as a control signal, wherein the ECM fan 1 is connected to the thermostat 3 through an indoor unit wiring board 2. On the indoor unit wiring board 2, the dial switch 4, the 24V power R interface 5, the fan control signal G interface 6, the auxiliary heat source control signal W interface 7, and the common terminal C interface 8 are provided. The control signal G can be set to the three gear positions of the ECM motor through the dial switch 4, and the installer can use the dial switch 4 according to factors such as the capacity of the field machine, the length of the air duct and the static pressure when installing the equipment, to connect the fan control signal G to the appropriate air volume position. The auxiliary heat source control signal W is connected to the second gear of the ECM motor. This connection mode is for safety reasons. Normally, when the auxiliary heat source control signal W is outputted, the fan control signal G must also be outputted to avoid overheating, because without the fan control signal G reaching to the ECM motor, there is risk of the fan being turned off. Therefore, when the auxiliary heat source control signal W is directly connected to the ECM motor, it can ensure that the fan is simultaneously turned on when the auxiliary heat source is turned on. For example, if the fan control signal G is set to connect to the ECM motor in the fifth gear when the equipment is installed, in the case of running cooling function, when the indoor temperature is close to the set temperature, the fan still runs in the fifth gear, the indoor temperature will be reached in a short time. Therefore, when the set temperature is reached and the machine is stopped, the dehumidification function is stopped, resulting in poor dehumidification performance of the air handler unit. Therefore, there is a need in the art for a control method that can improve the dehumidification performance of an air treatment unit while using an ECM motor.

SUMMARY OF THE DISCLOSURE

In order to solve the above technical problem, the present disclosure provides an ECM motor control system for a dual flow air treatment unit. The control system is comprised of an ECM motor 1, an indoor unit wiring board 2, and a thermostat 3, wherein the ECM motor 1 passes through an indoor unit wiring board 2, is connected to the thermostat 3; wherein the indoor unit wiring board 2 includes a dial switch 4, 24V power R interface 5, dehumidification control signal G2 interface 6, fan control signal G interface 7, auxiliary heat source control signal W interface 8 and common terminal C interface 9. The thermostat common terminal signal C is connected to the common end of the ECM motor through the common terminal C interface 9. The auxiliary heat source control signal W is connected to one gear of the ECM motor through the auxiliary heat source control signal W interface 8. The fan control signal G is connected to one gear of the ECM motor through the fan control signal G interface 7 and the dial switch 4. The dehumidification control signal G2 is connected to one gear lower than G of the ECM motor through the dehumidification control signal G2 interface 6. The 24V power supply of the thermostat 3 is connected to the 24V power supply R interface 5.

The disclosure also provides an ECM motor control method for a dual flow air treatment unit, the method comprising:

a. a dehumidification control signal G2, which is set by the thermostat, and a dehumidification control signal G2 interface, which is connected in the ECM motor drive circuit, such that the dehumidification control signal G2 is connected to a gear position lower than the fan control signal G in the ECM motor;

b. a preset temperature threshold $\Delta T$ and an indoor cooling target temperature T0, wherein when the indoor real-time temperature T is above $T0+\Delta T$, the thermostat 3 outputs the fan control signal G without outputting the dehumidification control signal G2, and when the indoor real-time temperature T is at $T0+\Delta T$ or less, the thermostat 3 does not output the fan control signal G, but outputs the dehumidification control signal G2.

DETAILED DESCRIPTION OF THE DISCLOSURE

First Embodiment

Figure 1:
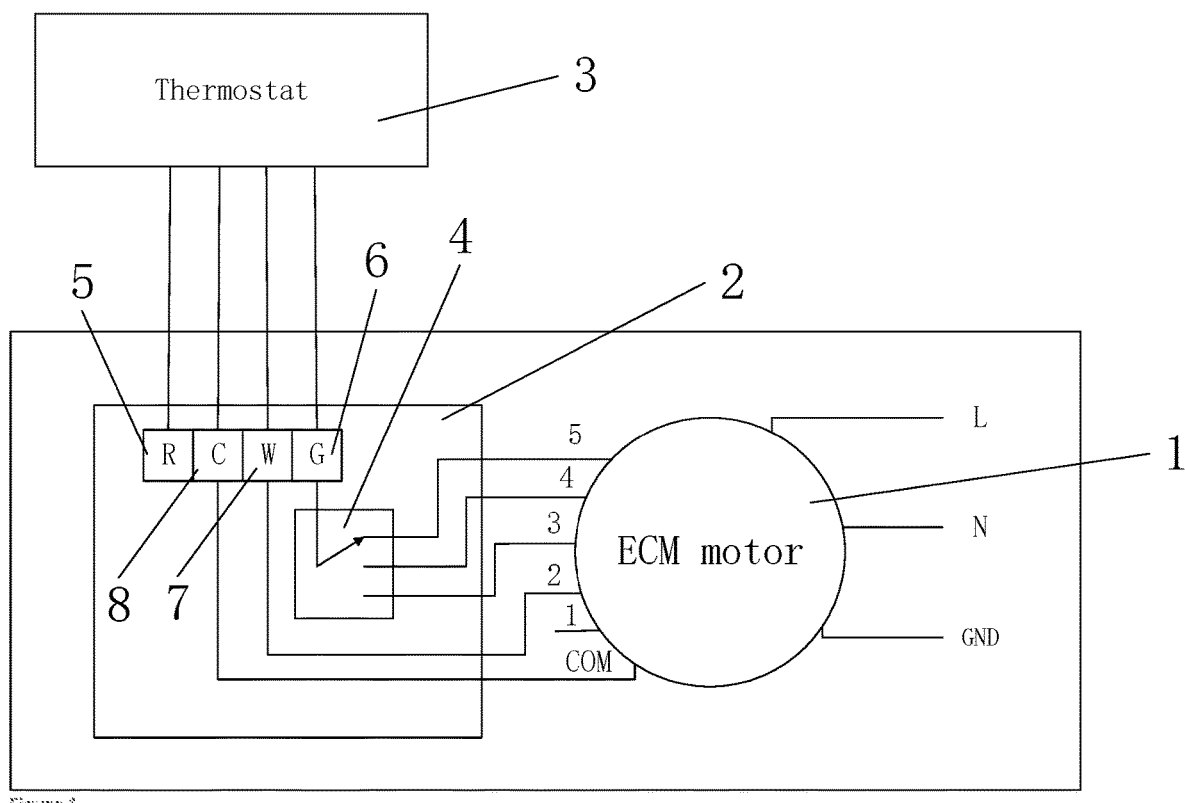
FIG. 1 shows an existed ECM motor and thermostat connection system diagram.
Figure 2:
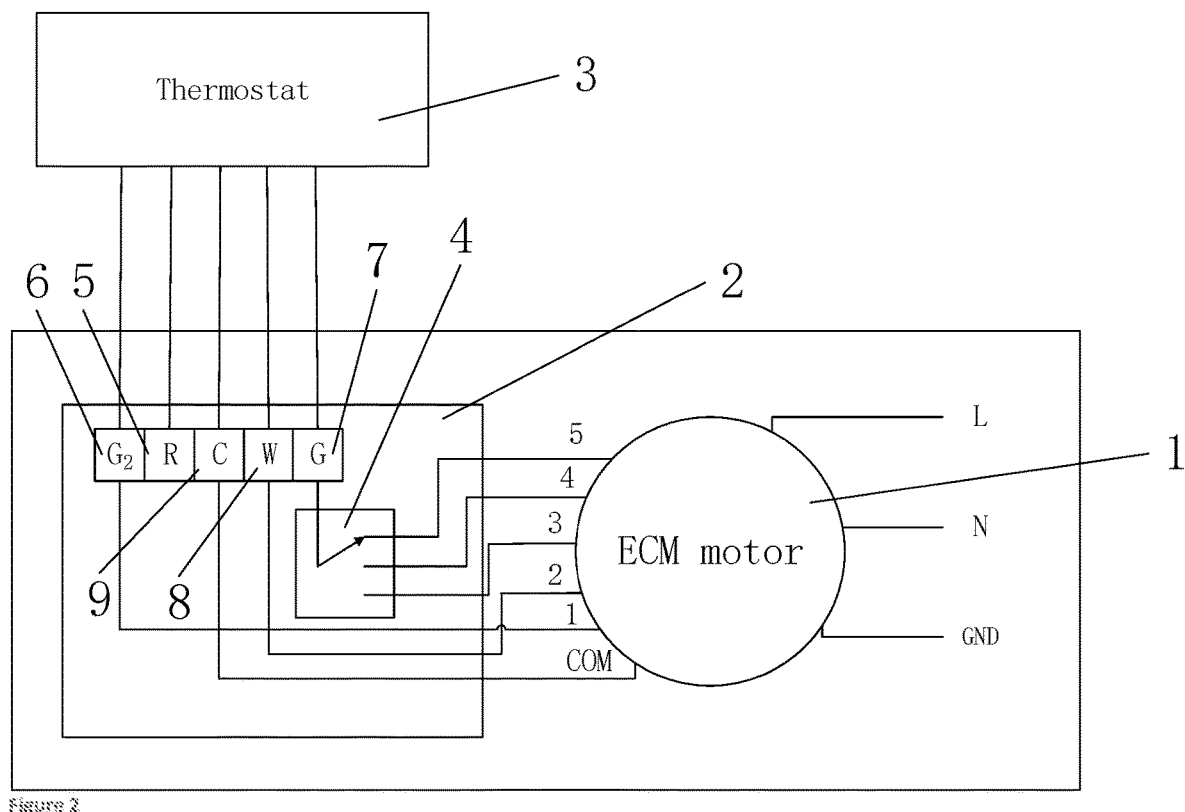
FIG. 2 shows a system diagram of the ECM motor and thermostat connection according to the first embodiment of this disclosure.
Figure 3:
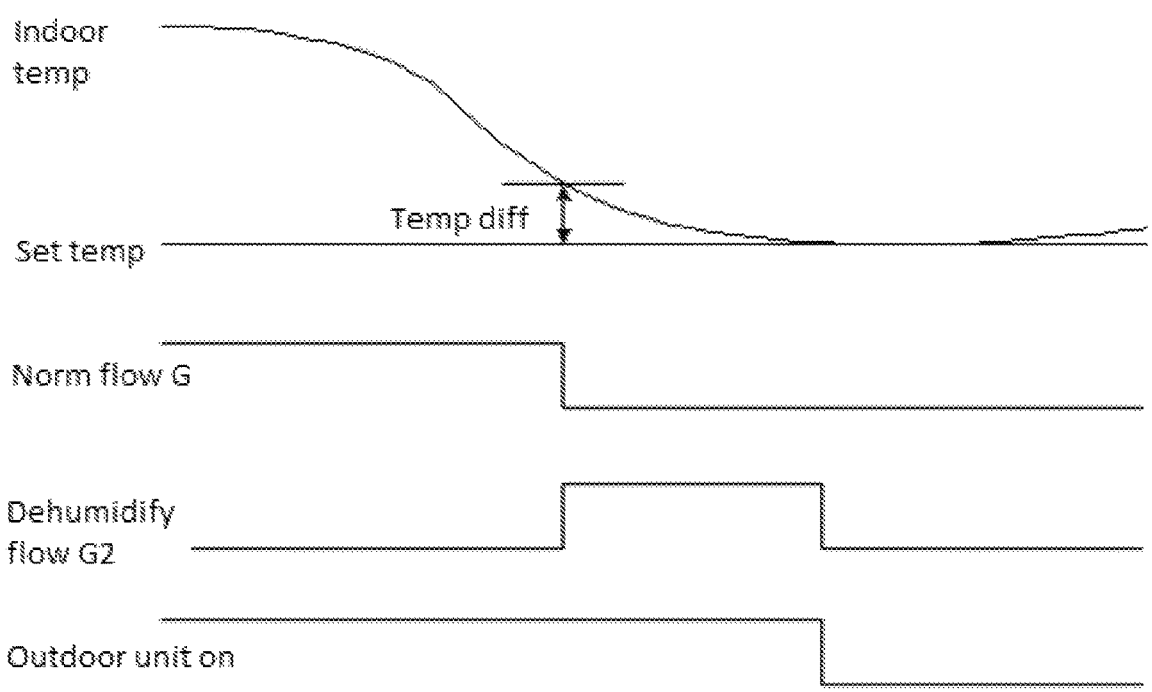
FIG. 3 shows a relationship plot diagram between temperature curve and control signal logic according to the first embodiment of this disclosure.

FIG. 2 is a schematic view showing the connection structure of the ECM motor 1 and the thermostat of the present embodiment. As shown in FIG. 2, the ECM motor 1 in this embodiment is connected to the thermostat 3 through the indoor unit wiring board 2, and the indoor unit wiring board 2 includes a DIP switch 4, 24V power supply R interface 5, and a dehumidification control signal. G2 interface 6, fan control signal G interface 7, auxiliary heat source control signal W interface 8 and common terminal C interface 9. The thermostat common terminal signal C is connected to the common end of the ECM motor through the common terminal C interface 9.

The auxiliary heat source control signal W is connected to the second gear of the ECM motor through the auxiliary heat source control signal W interface 8. The fan control signal G is connected to the fifth gear of the ECM motor through the fan control signal G interface 7 and the dial switch 4. The dehumidification control signal G2 is connected to the first gear of the ECM motor through the dehumidification control signal G2 interface 6. The 24V power supply of the thermostat 3 is connected to the 24V power supply R interface 5.

The air processing unit of the present embodiment sets the temperature threshold $\Delta T$ and the indoor cooling target temperature T0 during cooling, and when the indoor real-time temperature T is above T0+$\Delta T$, the thermostat 3 outputs the fan control signal G without output the dehumidification control signal G2 is applied. Conversely, when the indoor real-time temperature T is at T0+$\Delta T$ or less, the thermostat 3 does not output the fan control signal G, but outputs the dehumidification control signal G2.

Alternatively, the thermostat 3 can be configured to run continuously when cooling for outputting the dehumidification control signal G2. When the indoor real-time temperature T is above T0+$\Delta T$, the thermostat 3 changes to output the fan control signal G. When the indoor real-time temperature T is at T0+$\Delta T$ or less, the thermostat 3 reverts to outputting the dehumidification control signal G2.

The $\Delta T$ is set to 3° F., and the value of the threshold $\Delta T$ cannot be too large, to avoid switching from the cooling mode to the dehumidification mode prematurely, and to avoid slowing down the cooling and affecting the cooling performance. But if the threshold setting is too small, the dehumidification running time is too short and it will negatively affect dehumidification. Therefore, 3° F. is an all-around value as considered above.

The invention claimed is:

1. A dual flow air control system, comprising an ECM motor, an indoor unit wiring board, and a thermostat,
    wherein the ECM motor passes through the indoor unit wiring board, is connected to the thermostat; and
    the indoor unit wiring board includes a control power interface, dehumidification control signal G2 interface, fan control signal G interface, auxiliary heat source control signal W interface and common terminal C interface; and
    a thermostat common terminal signal C is connected to a common end of the ECM motor through the common terminal C interface; and
    an auxiliary heat source control signal W is connected to one gear of the ECM motor; and
    a fan control signal G is connected to one gear of the ECM motor; and
    a dehumidification control signal G2 is connected to one gear lower than the fan control signal G of the ECM motor; and
    the thermostat is configured to the output dehumidification control signal G2 when an indoor real-time temperature T is at T0+$\Delta T$ or less, where $\Delta T$ is a temperature threshold and T0 is an indoor cooling target temperature during cooling; and
    the thermostat is configured to the output fan control signal G when the indoor real-time temperature T is greater than T0+$\Delta T$.

2. A dual flow air control method for an ECM motor, comprising:
    generating a dehumidification control signal G2;
    generating a fan control signal G;
    generating an auxiliary heat source control signal W; and
    wherein the auxiliary heat source control signal W is sent to one gear of the ECM motor; and
    the fan control signal G is sent to one gear of the ECM motor; and
    the dehumidification control signal G2 is sent to one gear lower than the fan control signal G of the ECM motor; and
    sending the dehumidification control signal G2 when an indoor real-time temperature T is at T0+$\Delta T$ or less, where $\Delta T$ is a temperature threshold and T0 is an indoor cooling target temperature during cooling; and
    sending the fan control signal G when the indoor real-time temperature T is greater than T0+$\Delta T$.

3. A non-transitory computer-readable medium having stored thereon the set of computer-executable instructions for causing a first device for ECM motor to perform the steps comprising:
    generating a dehumidification control signal G2;
    generating a fan control signal G;
    generating an auxiliary heat source control signal W; and
    wherein the auxiliary heat source control signal W is sent to one gear of the ECM motor; and
    the fan control signal G is sent to one gear of the ECM motor; and
    the dehumidification control signal G2 is sent to one gear lower than G of the ECM motor; and
    sending the dehumidification control signal G2 when an indoor real-time temperature T is at T0+$\Delta T$ or less, where $\Delta T$ is temperature threshold and T0 is an indoor cooling target temperature during cooling; and
    sending the fan control signal G when the indoor real-time temperature T is greater than T0+$\Delta T$.

* * * * *